(12) United States Patent
Brooks

(10) Patent No.: US 8,087,894 B2
(45) Date of Patent: Jan. 3, 2012

(54) APERTURE AND FLAP VERTICAL AXIS WIND MACHINE

(76) Inventor: Franklin Charles Brooks, St. Charles, MO (US)

( * ) Notice: Subject to any disclaimer, the term of this patent is extended or adjusted under 35 U.S.C. 154(b) by 670 days.

(21) Appl. No.: 12/247,200

(22) Filed: Oct. 7, 2008

(65) Prior Publication Data

US 2009/0092490 A1   Apr. 9, 2009

Related U.S. Application Data

(60) Provisional application No. 60/978,742, filed on Oct. 9, 2007.

(51) Int. Cl.
*B64C 11/06* (2006.01)
*F03D 9/00* (2006.01)

(52) U.S. Cl. .......................................... 416/117; 290/55

(58) Field of Classification Search .................... 416/24, 416/117, 90 R, 119, 135, 205, 204 R; 290/44, 290/55; 415/4.4
See application file for complete search history.

(56) References Cited

U.S. PATENT DOCUMENTS

| | | | | | |
|---|---|---|---|---|---|
| 1,341,045 | A | * | 5/1920 | Currey | 416/135 |
| 1,469,064 | A | * | 9/1923 | Zucker | 415/4.4 |
| 2,038,467 | A | * | 4/1936 | Zanoski | 416/119 |
| 3,099,220 | A | * | 7/1963 | Butman | 417/336 |
| 4,134,710 | A | * | 1/1979 | Atherton | 416/117 |
| 4,496,283 | A | * | 1/1985 | Kodric | 416/44 |
| 4,684,817 | A | * | 8/1987 | Goldwater | 290/55 |
| 5,126,584 | A | * | 6/1992 | Ouellet | 290/55 |
| 5,266,006 | A | * | 11/1993 | Tsui et al. | 416/119 |
| 2003/0025335 | A1 | * | 2/2003 | Elder | 290/55 |
| 2004/0141851 | A1 | * | 7/2004 | Hite | 417/61 |

* cited by examiner

*Primary Examiner* — Thomas L Dickey
*Assistant Examiner* — Nikolay Yushin
(74) *Attorney, Agent, or Firm* — Patent Technologies, LLC; Robert D. Gunderman, Jr.

(57) ABSTRACT

A vertical axis wind machine having a mechanism of apertures and flaps to reduce return blade wind drag. The aperture and flap vertical axis wind machine has improved rotational speed and torque in relation to existing vertical axis wind machines. The aperture and flap vertical axis wind machine is also quieter, has fewer moving parts, requires no feathering controls to operate in high wind speeds, and can be operated independent of wind direction.

17 Claims, 8 Drawing Sheets

APERTURE AND FLAP VERTICAL AXIS WIND MACHINE

CROSS-REFERENCE TO RELATED PATENT APPLICATIONS

This application claims the benefit of the filing date of U.S. Provisional Patent Application No. 60/978,742 filed on Oct. 9, 2007.

BACKGROUND OF THE INVENTION

1. Field of the Invention

This invention relates generally to wind turbines and windmills, and more particularly to a vertical axis wind machine having apertures and flaps.

2. Description of Related Art

Wind machines such as windmills and wind turbines have been made and used over the centuries to utilize the naturally occurring power of the wind for tasks such as grinding grain, pumping water, and, more recently, for generating electricity. Wind machines fall in two primary classes horizontal axis machines and vertical axis machines. The first instance of a wind powered machine was probably a windwheel operating an organ by Hero of Alexandria in the $1^{st}$ century AD. Vertical axis wind machines were first used in eastern Persia by the $9^{th}$ century AD. Several centuries later, in the 1180s, horizontal axis windmills were invented and used in northwestern Europe.

The orientation of a wind machine to capture maximum wind energy has profound implications with horizontal axis wind machines having vertical blades. The need to orient a horizontal axis wind machine to capture maximum wind energy has led to moveable mechanical components, as well as, in recent history, electronic controls. These components add tremendously to the efficiency of a horizontal axis wind machine, but also increase cost and maintenance. In addition, a horizontal axis wind machine has both a startup wind speed and a maximum wind speed. This often times leads to the unfortunate consequence that the wind machine cannot operate during times of peak wind energy. In addition, operation of many horizontal axis wind machines in high wind speeds will damage or destroy the wind machine. This problem is not as prevalent with vertical axis wind machines due to the inherent drag that is created when a blade on a vertical axis machine rotates against the direction of the wind. This drag slows the rotational speed of a vertical axis machine, and also lowers its efficiency. Nonetheless, vertical axis wind machines are still desirable due to their simplicity and lower cost. There are no complicated mechanical or electrical controls required to steer the wind machine into an orientation that achieves maximum efficiencies. The slower rotational speed and lower efficiencies of vertical axis wind machines are shortcomings that limit their widespread use, and make vertical axis wind machines undesirable for electricity generation where higher rotational speeds are required. The present invention, as described by way of this specification and the attached drawings, overcomes the shortcomings of vertical axis wind machines.

It is therefore an object of the present invention to provide a vertical axis wind machine that has improved efficiencies. It is another object of the present invention to provide a vertical axis wind machine that has lower return drag. It is yet another object of the present invention to provide a vertical axis wind machine that has improved torque characteristics. It is yet another object of the present invention to provide a vertical axis wind machine that has lower operating noise. It is still another object of the present invention to provide a vertical axis wind machine that does not require feathering controls in high wind conditions. It is another object of the present invention to provide a vertical axis wind machine that is independent of wind direction and has fewer moving parts.

BRIEF SUMMARY OF THE INVENTION

In accordance with the present invention, there is provided a vertical axis wind machine having a frame, a vertical axis free to rotate within said frame, an upper and a lower hub connected to the vertical axis, a plurality of blades connected to the vertical axis by way of cross members, and apertures and flaps placed, within each blade to allow wind to pass through said flap or push against said flap depending on the position of the blade in rotation.

The foregoing paragraph has been provided by way of introduction, and is not intended to limit the scope of the invention as defined by this specification, drawings, and the attached claims.

BRIEF DESCRIPTION OF THE DRAWINGS

The invention will be described by reference to the following drawings, in which like numerals refer to like elements, and in which.

Figure 1:
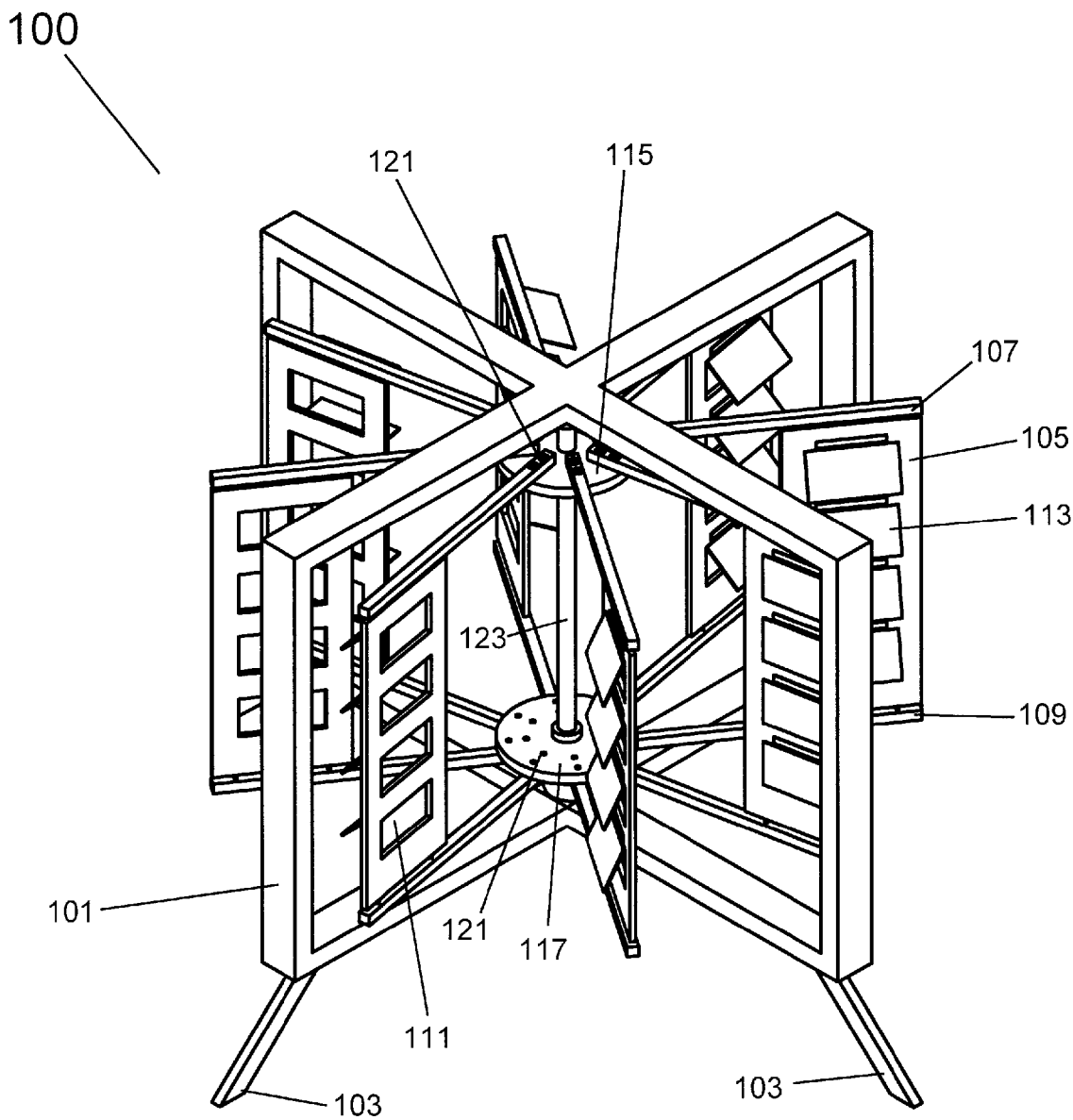
FIG. 1 is a perspective view of the aperture and flap vertical axis wind machine.

The present invention will be described in connection with a preferred embodiment, however, it will be understood that there is no intent to limit the invention to the embodiment described. On the contrary, the intent Is to cover all alternatives, modifications, and equivalents as may be included within the spirit and scope of the invention as defined by this specification, drawings and attached claims.

DESCRIPTION OF THE PREFERRED EMBODIMENTS

For a general understanding of the present invention, reference is made to the drawings. In the drawings, like reference numerals have been used throughout to designate identical elements.

FIG. 1 is a perspective view of the aperture and flap vertical axis wind machine. Referring to FIG. 1, one can see a frame 101 that provides structural support and structural Integrity to the rotating assemblage contained within the frame. The frame 101 may be made from steel, aluminum, titanium, carbon fiber, fiberglass, cast iron, brass, stainless steel, or other suitable material. Within the frame 101 can be seen a vertical axis 123 that is free to rotate with respect to the frame 101. The vertical axis 123 may be seated in bearing assemblies at the interlace between the ends of the vertical axis 123 and the frame 101. The bearing assemblies cannot be readily seen in FIG. 1. The vertical axis 123 may be made from steel aluminum, titanium, carbon fiber, fiberglass, cast iron, brass, stainless steel, or other suitable material. Attached to the vertical axis 123 are an upper hub 115 and a lower hub 117. The upper and lower hubs are attached to the vertical axis using techniques such as welding, brazing, mechanical fastening, and the like. The upper and lower hubs are also made from steel, aluminum, titanium, carbon fiber, fiberglass, cast iron, brass, stainless steel, or other suitable material. In some embodiments of the present invention, the upper and lower hubs may be integrally formed with the vertical axis 123 using techniques such as metal lathing or casting. The upper and lower hubs serve as support and attachment points for a lower cross member 109 and an upper cross member 107. The upper hub 115, for example, may contain a plurality of upper cross member terminations. In a similar manner, the lower hub 117, for example, may contain a plurality of lower cross member terminations. Each cross member terminates at one end at the hub and supports a blade 105 at the opposing end. Such a termination arrangement can be seen in FIG. 1 for both the upper hub and upper cross members and the lower hub and lower cross members. The upper and lower cross members are made from steel, aluminum, titanium, carbon fiber, fiberglass, cast iron, brass, stainless steel, or other suitable material. Further, each cross member, both upper and lower, is terminated to the upper or lower hub respectively using a technique such as welding, mechanical fastening, or the like. FIG. 1 depicts, by example and not limitation, the use of fasteners 121. In addition, each upper cross member is attached to the upper part of a blade 105, and each lower cross member is attached to the lower part of a blade 105. The upper cross member 107 and the lower cross member 109 may also, in some embodiments of the present invention, be integral with the blade 105. The resulting assembly creates a spoke like arrangement of blades emanating from the vertical axis. The number of blades and associated cross members may vary. FIG. 1 depicts an eight blade machine, however, blade count may vary without departing from the spirit and broad scope of the invention as described herein. Blades 105 may be made from carbon fiber, fiberglass, a natural or manmade cloth, kevlar, spunbonded polyolefin, a plastic, a metal, or the like.

Figure 4:
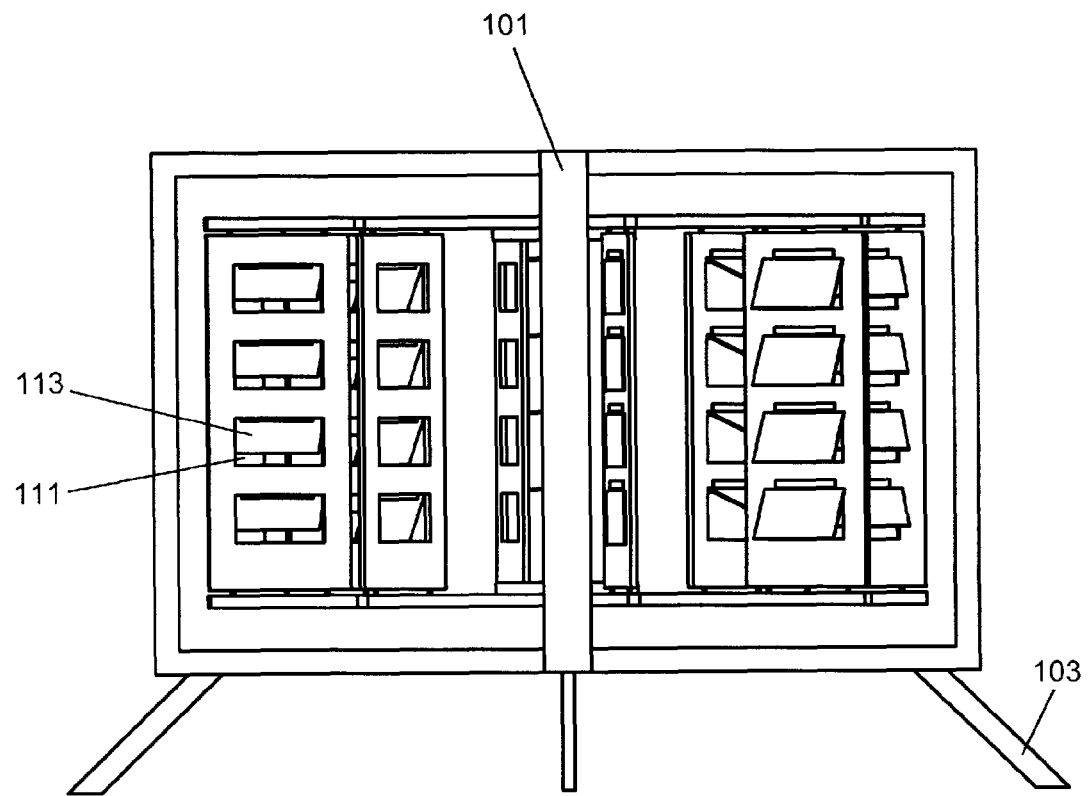
FIG. 4 is a side view of the aperture and flap vertical axis wind machine in a first position of rotation.
Figure 5:
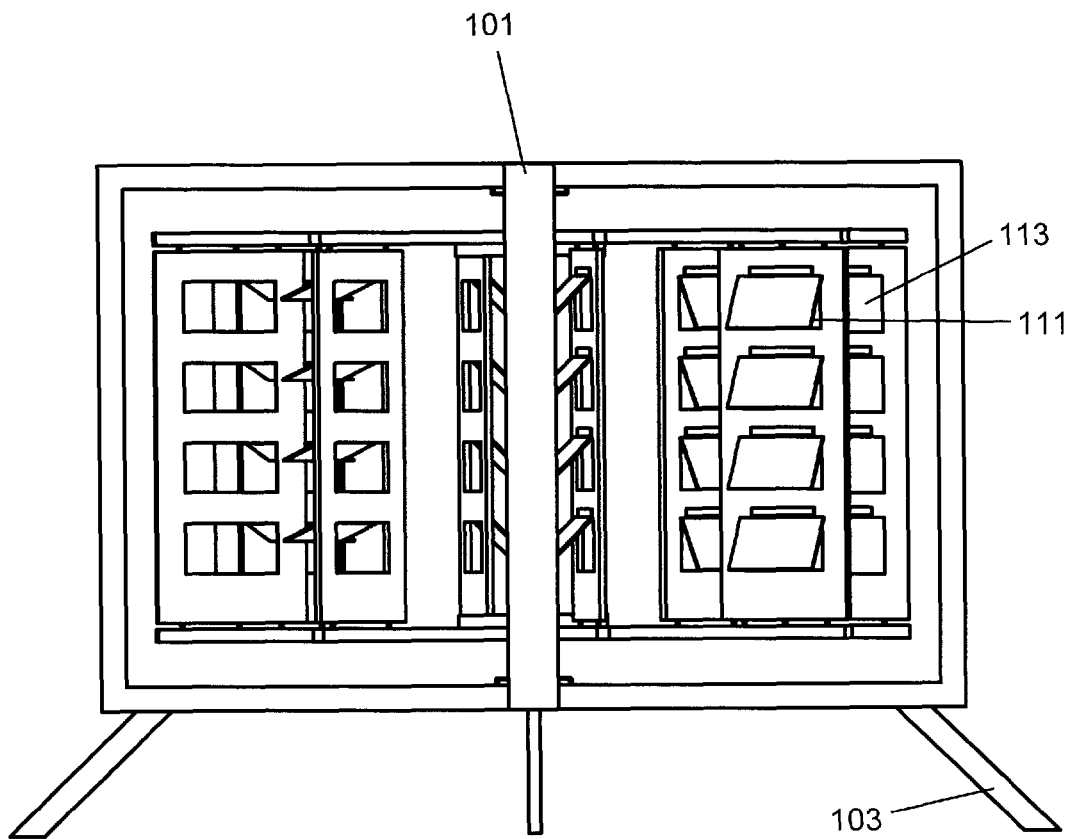
FIG. 5 is a side view of the aperture and flap vertical axis wind machine in a second position of rotation.
Figure 6:
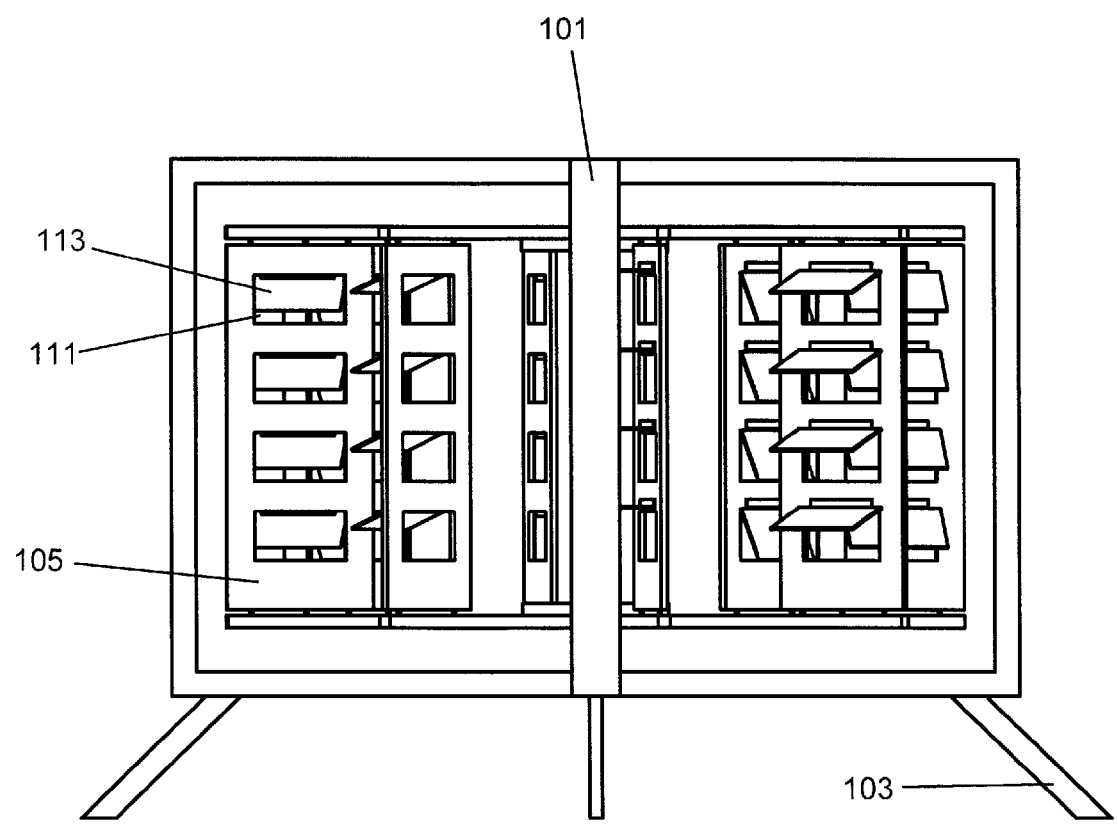
FIG. 6 is a side view of the aperture and flap vertical axis wind machine in a third position of rotation.

FIG. 1 also depicts a plurality of apertures 111 contained within each blade 105. The apertures 111 are depicted as rectangular openings in each blade 105. Other embodiments of the present invention may use round openings, oval, openings, square openings, octagonal, openings, triangular openings, and the like. Contained within each aperture 111 is a flap 113 that has a pivoting structure such as, for example, a hinge, to allow attachment of the flap 113 to the aperture 111. The flap 113 is free to move in the aperture 111 when encountering air flow in one direction, and restricted from moving when encountering air flow in an opposite direction. This may be accomplished, for example, by making the flap 113 slightly larger than the size of the aperture 111 and attaching the flap 113 to one side of the blade 105. Care must be taken when fabricating and arranging multiple blades on the vertical axis to ensure that each flap is oriented properly, thus allowing for proper operation of the wind machine. FIGS. 4, 5 and 6 appended herein provide flap and blade positions at various positions of rotation. Other techniques to allow the flap 113 tree movement when encountering air flow in one direction, and restricted movement when encountering air flow in another direction, include pins, mechanical stops, magnetic latches, and the like. Flaps 113 may be made from carbon fiber, fiberglass, a natural or manmade cloth, kevlar, spunbonded polyolefin, a plastic, a metal, or the like.

FIG. 1 depicts each blade 105 spanning only a portion of the length of the upper cross member 107 and the lower cross member 109. In other embodiments of the present invention, the blade 105 may span more or less of the full length of the upper cross member 107 and the lower cross member 109. In addition, FIG. 1 depicts a single vertical column of four aperture and flap pairs. In other embodiments of the present invention, additional or less aperture and flap pairs may be used. Also, additional columns and rows of aperture and flap pairs may be used without departing from the spirit and broad scope of the present invention.

FIG. 1 also shows the frame 101 supported by a stand 103. The stand 103 may be made from steel, aluminum, titanium, carbon fiber, fiberglass, cast iron, brass, stainless steel, or other suitable material. The stand 103 may be freestanding, or it may be attached to a building or structure. The stand 103 may also be set in concrete or a similar footing material. In some embodiments of the present invention, a stand 103 may also be omitted and replaced with a suitable mounting arrangement.

Figure 2:
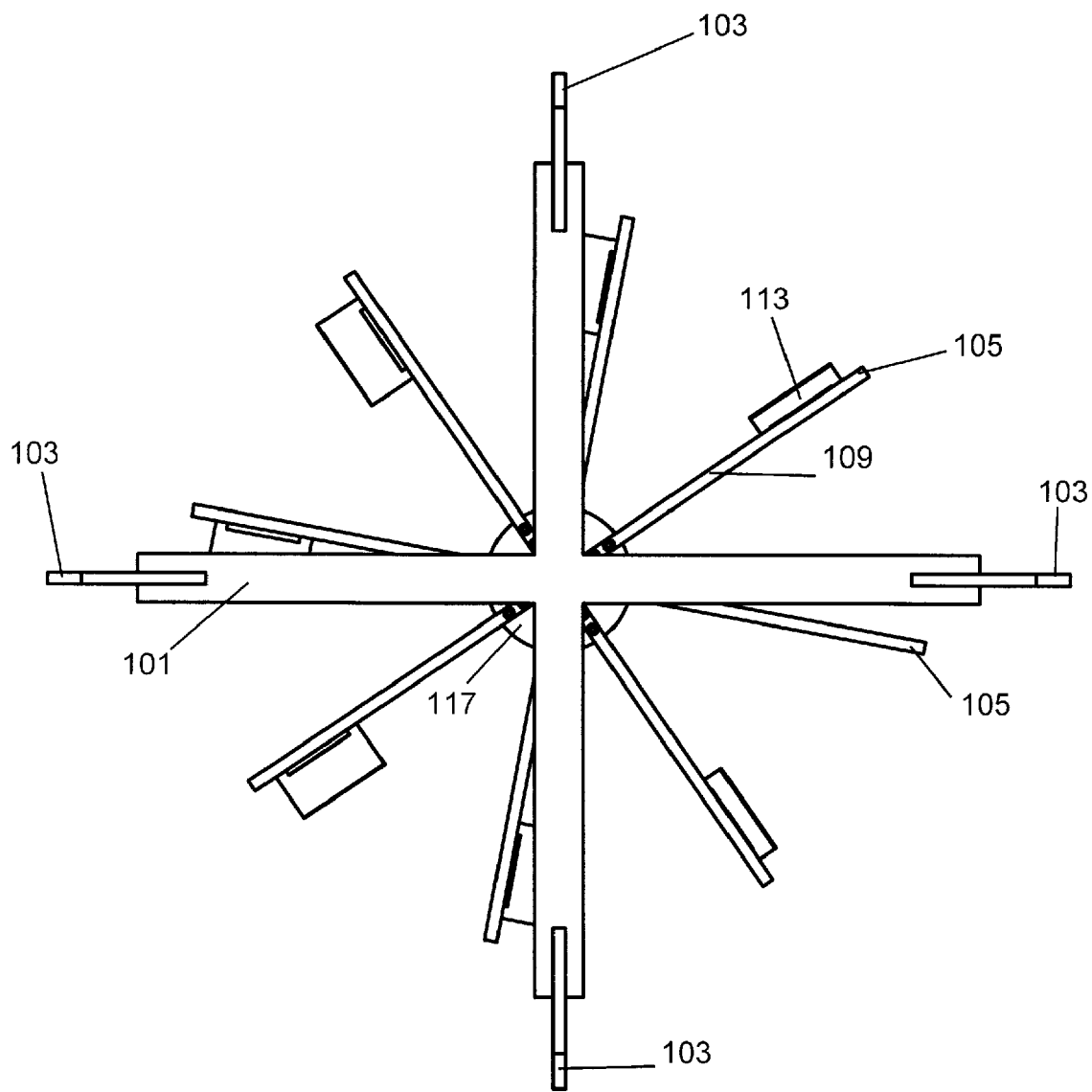
FIG. 2 is a bottom plan view of the aperture and flap vertical axis wind machine.
Figure 3:
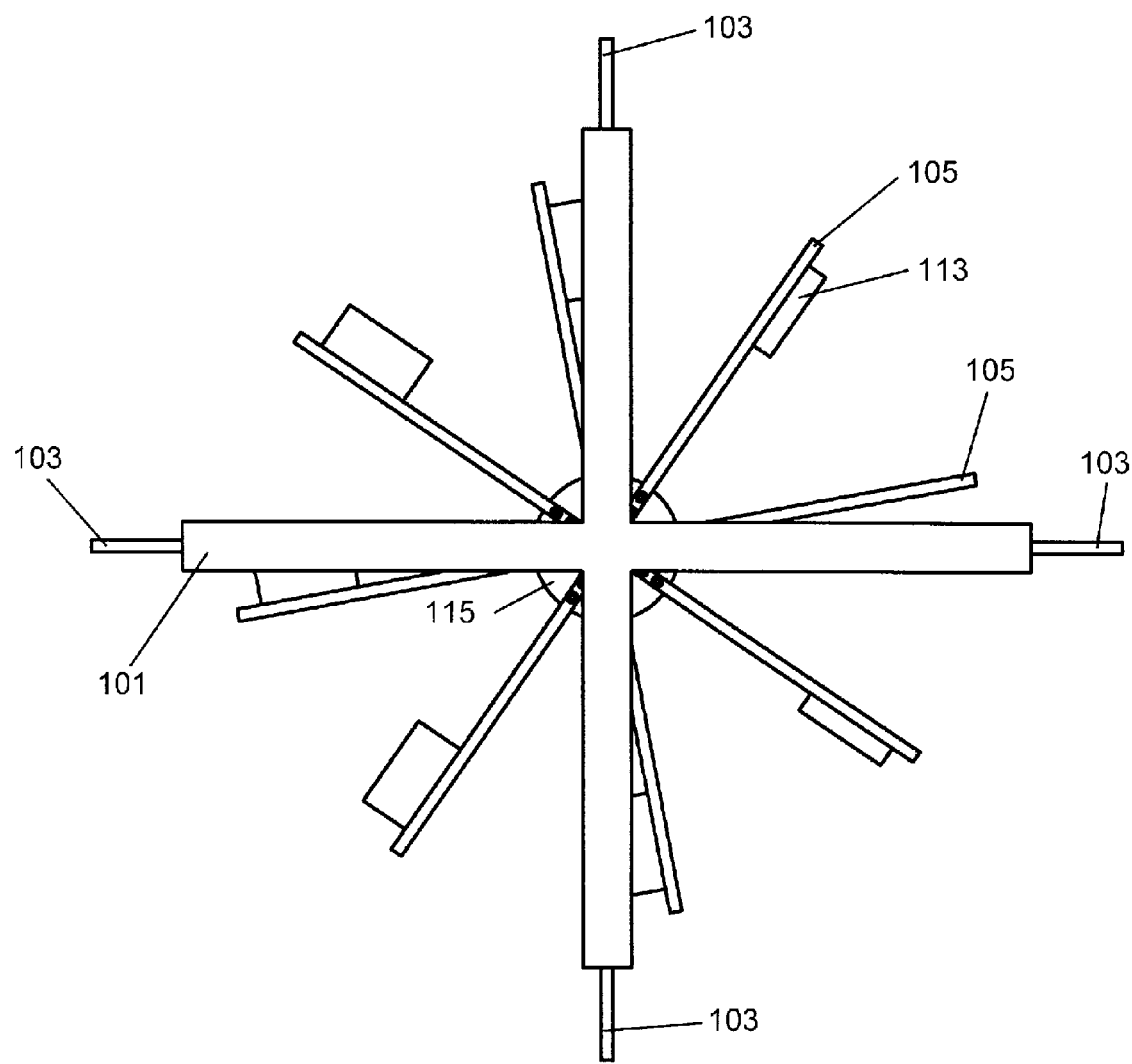
FIG. 3 is a top plan view of the aperture and flap vertical axis wind machine.

Turning now to FIG. 2, a bottom plan view of the aperture and flap vertical axis wind machine is illustrated. The structural geometry of the frame 101 can be clearly seen along with the stand 103. The eight blades of this exemplary embodiment are shown with their associated flaps 113 in various stages of open or closed position. In a similar manner, FIG. 3 shows a top plan view of the aperture and flap vertical axis wind machine.

It should be noted that the inventor has constructed a model of the present invention, and has observed its operation using a fen to generate wind. The benefits of the aperture and flap arrangement of the present invention were thus observed. In addition, a digital video of the operation of the present invention was used to generate a three dimensional model of the present invention. This three dimensional model was used not only to simulate the complex motion of the multitude of flaps, but the three dimensional model was also used to generate the illustrations contained herein. The complex motion of the flaps was simulated using Autodesk Inventor™, and the resultant positions have been depicted as a time series in FIGS. 4, 5 and 6 respectively. FIG. 4 is a side view of the aperture and flap vertical axis wind machine in a first position of rotation. FIG. 5 is a side view of the aperture and flap vertical axis wind machine in a second position of rotation. And FIG. 6 is a side view of the aperture and flap vertical axis wind machine in a third position of rotation. The apertures and flaps contained on each blade of the present invention serve to reduce return travel air drag, thus improving rotational speed and torque, reducing wind, drag losses, and improving efficiencies over existing vertical axis wind machines.

Figure 7:
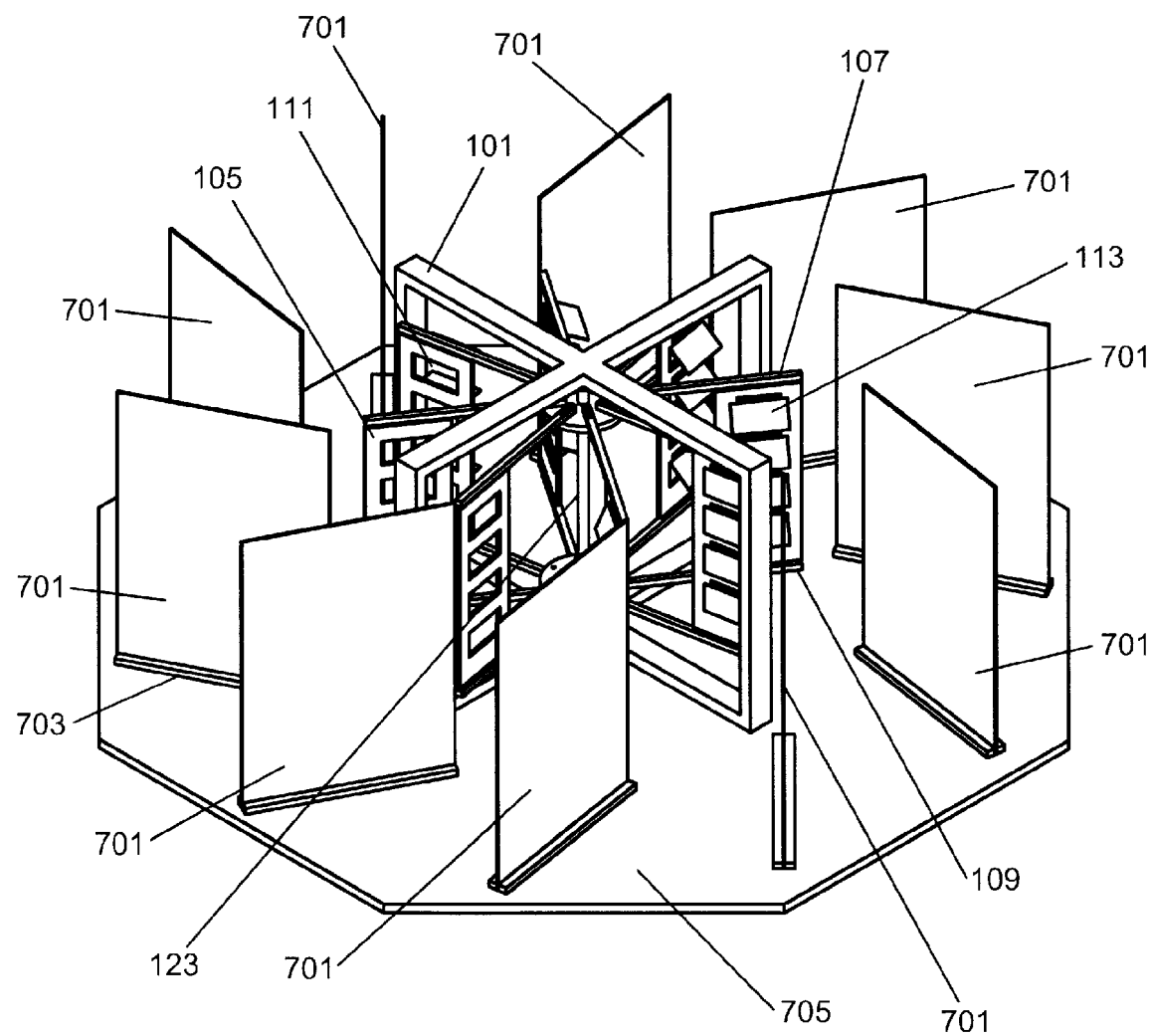
FIG. 7 is a perspective view of the aperture and flap vertical axis wind machine with the addition of a stator assembly.
Figure 8:
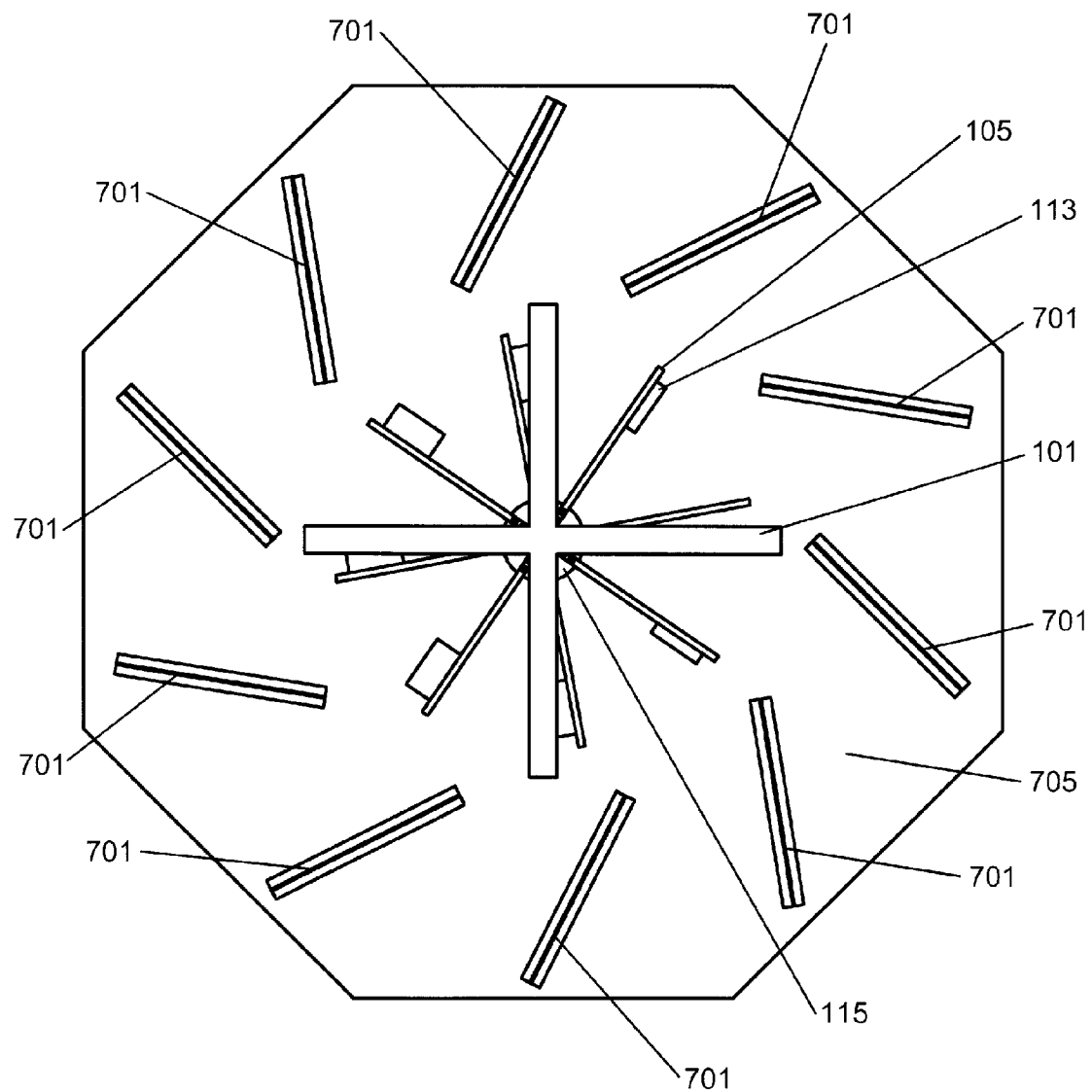
FIG. 8 is a top plan view of the aperture and flap vertical axis wind machine with the addition of a stator assembly.

To further improve efficiencies of the present invention, some embodiments may also incorporate a stator structure to redirect wind so that it strikes the blades of the wind machine in a more optimal manner. The inventor has observed, after constructing the stator assembly, that the rotational speed of the wind machine increased with the addition of stators. Such a stator structure is depicted in FIGS. 7 and 8. In FIG. 7, a perspective view of the aperture and flap vertical axis wind machine with the addition of a stator assembly is depicted. In FIG. 7, a plurality of stators 701 can be seen, each attached to a stator base 703 that are further mounted to a mounting surface 705 such as a concrete pad, a metal structure, or the like. In FIG. 7, the frame 101 is also mounted to the mounting surface 705. The plurality of stators 701 surround the components of the aperture and flap vertical axis wind machine, and serve to redirect wind. The stators 701 may be made from carbon fiber, fiberglass, kevlar, plastic, a metal, a fabric, or the like. The stator base 703 joins each stator to the mounting surface 705, and may be made from the same material as the stators 701, or may be made from any material used to fasten or join two or more parts.

In FIG. 8 a top plan view of the aperture and flap vertical axis wind machine with the addition of a stator assembly is depicted. As can be seen in the embodiment depicted in both FIGS. 7 and 8, there are ten stators shown. Other embodiments of the present invention may use more than 10 stators or less than 10 stators without departing from the spirit and scope of the present invention as described herein. In FIG. 8, the stators are each at a 45 degree angle with respect to a series of imaginary lines that go through the center of an imaginary circle the center of which is at the location of the vertical axis. Other angles may also be used dependent on such factors as the application, the number of blades, apertures and flaps, and the overall configuration of the wind machine. Other variables that may be adjusted, and are within the scope and spirit of the present invention, include the distance between the stator and rotor spin area (the rotor spin area being the circular area through which the blades travel). Also, the height of each stator may be greater than the height of the blades. In some embodiments of the present invention, the width of each stator may also be approximately the same as the radius of the rotor spin area.

It is, therefore, apparent that there has been provided, in accordance with the various objects of the present invention, an Aperture and Flap Vertical Axis Wind Machine. While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the invention as defined by this specification, drawings and the attached claims.

What is claimed is:

1. A vertical axis wind machine comprising:
a frame;
a vertical axis free to rotate within said frame;
an upper and a lower hub connected to the vertical axis;
a plurality of blades connected to the vertical axis by way of cross members;
where each blade is firmly fixed to a cross member and each blade spans less than the entire length of each cross member;
apertures and rigid flaps placed within each blade to allow wind to pass through said rigid flap or push against said rigid flap depending on the position of the blade in rotation; and
a pivoting structure connecting the rigid flap to the aperture.

2. The vertical axis wind machine of claim 1, wherein the pivoting structure is hinged to allow free movement of the rigid flap when encountering air flow in one direction, and restricted movement of the rigid flap when encountering air flow in another direction.

3. The vertical axis wind machine of claim 1, further comprising a bearing assembly at each end of the vertical axis.

4. The vertical axis wind machine of claim 1, wherein there are eight blades connected to the vertical axis.

5. The vertical axis wind machine of claim 1, wherein there are ten blades connected to the vertical axis.

6. The vertical axis wind machine of claim 1, wherein the blades are made from carbon fiber.

7. The vertical axis wind machine of claim 1, wherein the blades are made from a metal.

8. The vertical axis wind machine of claim 1, wherein each aperture and rigid flap is rectangular.

9. The vertical axis wind machine of claim 1, wherein each aperture and rigid flap is triangular.

10. The vertical axis wind machine of claim 1, wherein each rigid flap is larger than its respective aperture.

11. The vertical axis wind machine of claim 1, wherein each blade has four aperture and rigid flap pairs.

12. The vertical axis wind machine of claim 1, further comprising a stand mounted to said frame.

13. The vertical axis wind machine of claim 12, wherein the stand is concrete.

14. The vertical axis wind machine of claim 12, wherein the stand is made from a metal.

15. A vertical axis wind machine comprising:
a frame;
a vertical axis free to rotate within said frame;
an upper and a lower hub connected to the vertical axis;
a plurality of blades connected to the vertical axis by way of cross members;
where each blade is firmly fixed to a cross member and each blade spans less than the entire length of each cross member;
apertures and rigid flaps placed within each blade to allow wind to pass through said rigid flap or push against said rigid flap depending on the position of the blade in rotation;
a pivoting structure connecting the rigid flap to the aperture; and
a plurality of stators to redirect wind to said blades.

16. The vertical axis wind machine of claim 15 further comprising a stator base mechanically coupled to each stator.

17. The vertical axis wind machine of claim 15 further comprising a stand mechanically coupled to the frame and to each stator base.

* * * * *